United States Patent

Hayashi et al.

[11] Patent Number: 5,982,461
[45] Date of Patent: Nov. 9, 1999

[54] LIGHT VALVE DEVICE

[76] Inventors: Yutaka Hayashi, 1-4, Umezono 1-chome, Tsukuba-shi, Ibaragi; Masaaki Kamiya, 31-1,Kameido 6-chome, Koto-ku, Tokyo; Yoshikazu Kojima; Hiroaki Takasu, both of 31-1, Kameido 6-chome, Koto-ku, Tokyo, all of Japan

[21] Appl. No.: 07/834,288

[22] PCT Filed: Apr. 26, 1991

[86] PCT No.: PCT/JP91/00580

§ 371 Date: Feb. 14, 1992

§ 102(e) Date: Feb. 14, 1992

[87] PCT Pub. No.: WO91/17471

PCT Pub. Date: Nov. 14, 1991

[30] Foreign Application Priority Data

Apr. 27, 1990 [JP] Japan ................................. 2-112977

[51] Int. Cl.⁶ .................................................. G02F 1/136
[52] U.S. Cl. ............................................................ 349/43
[58] Field of Search ................................. 359/82, 57, 58, 359/59; 257/49, 50, 347, 352, 353, 354; 437/225, 21, 83, 84, DIG. 974; 148/DIG. 135; 56/600; 349/41–43

[56] References Cited

U.S. PATENT DOCUMENTS

| | | | |
|---|---|---|---|
| 3,332,137 | 7/1967 | Kenney et al. . | |
| 4,024,626 | 5/1977 | Leupp et al. | 257/353 |
| 4,583,122 | 4/1986 | Ohwada et al. | 358/213 |
| 4,746,961 | 5/1988 | Konishi et al. | 257/60 |
| 4,768,076 | 8/1988 | Aoki et al. | 257/351 |
| 4,803,530 | 2/1989 | Taguchi et al. | 257/352 |
| 4,826,787 | 5/1989 | Muto et al. | 437/208 |
| 4,838,654 | 6/1989 | Hamaguchi et al. | 359/59 |
| 4,939,101 | 7/1990 | Black et al. | 437/62 |
| 4,954,855 | 9/1990 | Minusa et al. | 257/347 |
| 5,105,254 | 4/1992 | Terao | 257/347 |
| 5,144,390 | 9/1992 | Matlouban | 257/347 |
| 5,181,132 | 1/1993 | Shindo et al. | 359/81 |
| 5,185,280 | 2/1993 | Houston et al. | 437/44 |
| 5,206,749 | 4/1993 | Zavracky et al. | 359/59 |
| 5,250,931 | 10/1993 | Misawa et al. | 359/59 |
| 5,251,049 | 10/1993 | Sato et al. | 359/59 |
| 5,264,721 | 11/1993 | Gotou | 257/347 |
| 5,281,840 | 1/1994 | Sarma | 257/351 |
| 5,343,064 | 8/1994 | Spangler et al. | 257/350 |

FOREIGN PATENT DOCUMENTS

| | | |
|---|---|---|
| 0268380 | 5/1988 | European Pat. Off. . |
| 57-167655 | 10/1982 | Japan . |
| 59-126639 | 7/1984 | Japan . |
| 60-143666 | 7/1985 | Japan . |

OTHER PUBLICATIONS

Spangler, "A Technology for High Performance Single Crystal Silicon–on–Insulator Transistors", IEEE Electronic Device Letters, Apr., 1987 pp. 137–138.

Patent Abstracts of Japan, vol. 13, No. 228 (P–877) May 26, 1989 JP–A–1 038 727 (NEC) Feb. 9, 1989.

Patent Abstracts of Japan, vol. 13, No. 578 (E–864) Dec. 20, 1989 JP–A–1 241 862 (Sony) Sep. 26, 1989.

Patent Abstracts of Japan, vol. 10, No. 1 (E–371) Jan. 7, 1986 JP–A–60 167 364 (Matsushita) Aug. 30, 1985.

*Primary Examiner*—William L. Sikes
*Assistant Examiner*—James Dudek
*Attorney, Agent, or Firm*—Adams & Wilks

[57] ABSTRACT

A light valve device has a drive substrate integrated with a drive electrode. A transistor is connected to the drive electrode and a driving circuit energizes the drive electrode through the transistor. An opposed substrate is provided opposed to the drive electrode, and an electrooptical material layer is disposed between the drive substrate and the opposed substrate. The drive substrate has a structure comprising a substrate layer and a semiconductor single crystal thin film layer. The semiconductor single crystal thin film layer is made by thinning a semiconductor single crystal wafer which has been bonded to the substrate layer. The light valve device has a small size and high pixel density and can be formed using miniaturization technology. The light valve can be used for a small size, high resolution video projector and a color matrix display device.

49 Claims, 11 Drawing Sheets

FIG. 8
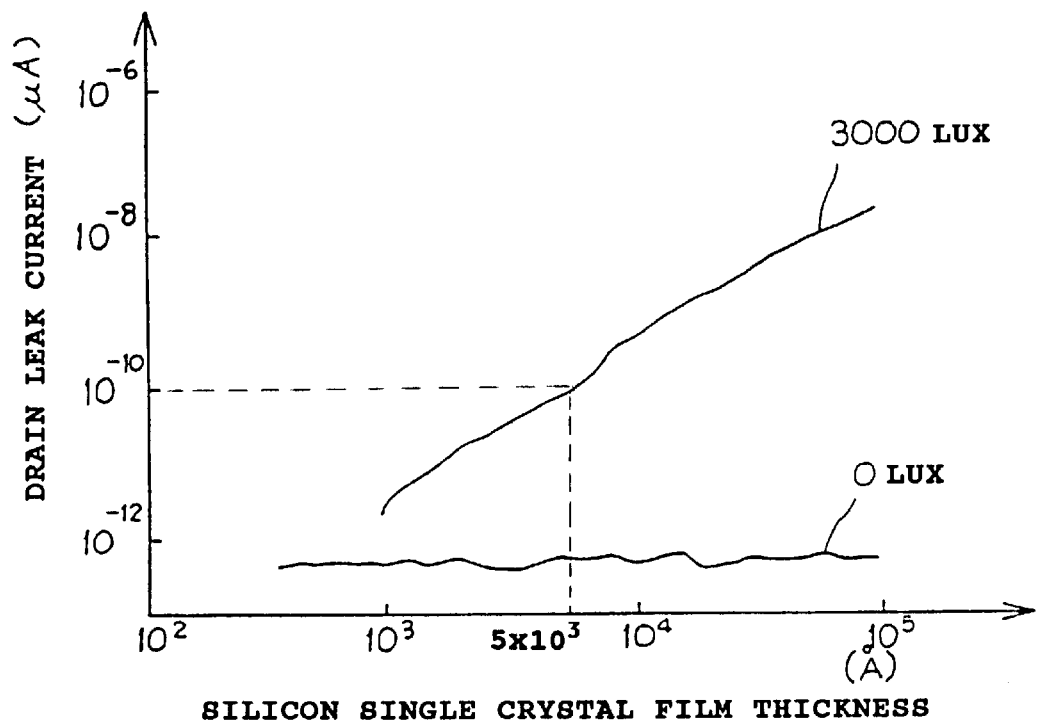
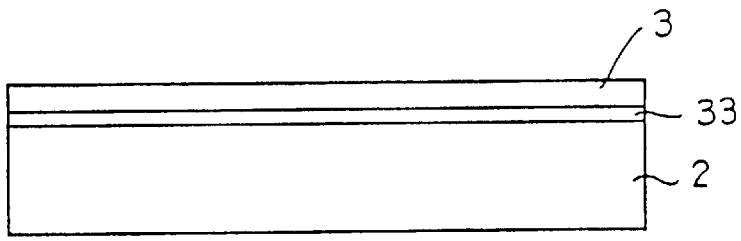
FIG. 9(A)
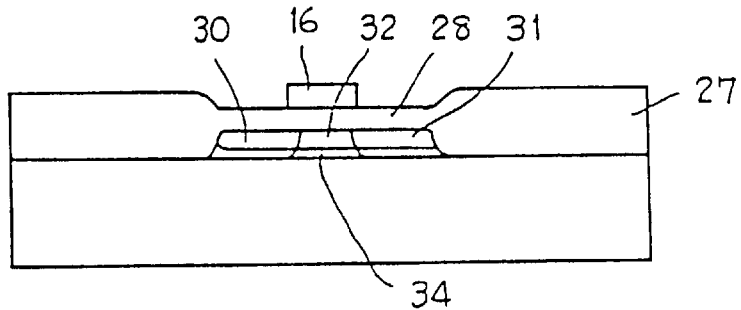
FIG. 9(B)

LIGHT VALVE DEVICE

FIELD OF THE INVENTION

The present invention relates to a planar type light valve device to be used in a direct viewing type display system or a projection type display system.

More specifically, the present invention relates to a light valve device, for example, an active matrix device, which packages integrally an integrated circuit substrate, in which a driving circuit is formed in a semiconductor thin film, as a liquid crystal panel.

BACKGROUND OF THE INVENTION

The active matrix device is based upon a simple principle, in which pixels are individually equipped with switch elements. If specific pixels are selected, the corresponding switch elements are turned on.

If no pixel is selected, the switch elements are left inconductive. These switch elements are formed over a glass substrate which forms part of the liquid crystal panel. Therefore, the thin film technology for forming the switch elements is important. Thin film transistors are usually formed as those elements.

In the active matrix device of the prior art, the thin film transistors are formed in the surface of an amorphous silicon thin film or a polycrystal silicon thin film, which is deposited on the glass substrate. The amorphous silicon thin film and the polycrystal silicon thin film are suited for fabricating an active matrix device of relatively large frame, because they can be easily deposited over the glass substrate by using the chemical vapor deposition (CVD) process.

Transistor elements, which are formed in the amorphous silicon thin film or the polycrystal silicon thin film, are generally of the field effect insulated gate type. At present active matrix liquid crystal devices of 3 inches to 10 inches in diagonal line using the amorphous silicon thin film are commercially produced. Since the amorphous silicon thin film can be formed at low temperature of 850° C. or less, the thin film is suited for producing a liquid crystal panel having a large frame. Further, in active matrix liquid crystal devices using the polycrystal silicon thin film, small-sized liquid crystal panels about 2 inches in diagonal line are commercially produced at present.

The active matrix device of the prior art using the amorphous silicon thin film or the polycrystal silicon thin film is suited to the direct viewing type display system necessary for relatively large frame, but not necessarily suited for miniaturizing the device and heightening the density of pixels.

In recent years, however, a high demand has arisen not for the direct viewing type display device but rather for a microminiature display device or a light valve device which have miniature pixels of high density. A microminiature light valve device is used as a plane for forming a primary image of a projection type image device, for example, and can be applied for use in a projection type high-vision TV. For this application, it is possible to provide a microminiature light valve device, which has a pixel size on the order of 1 $\mu$m and an overall size of several cm by using the miniature semiconductor fabricating technology.

In case, however, the existing amorphous or polycrystal thin film is used, the transistor elements of sub-micron order cannot be formed by applying the miniature semiconductor technology. In case of the amorphous silicon thin film, for example, its practical film forming temperature is about 800° C. so that a high-temperature treatment necessary for the miniaturization cannot be executed. In case of the polycrystal silicon thin film, on the other hand, the crystal particles have a size of several $\mu$m raising a problem in that the miniaturization of the thin film elements is necessarily restricted.

Further, since the film forming temperature of the polycrystal silicon thin film is about 600° C., miniaturization technology necessary for the high-temperature treatment of at least 1000° C. cannot be executed sufficiently. In the existing active matrix display device using the amorphous or the polycrystal silicon thin film, as has been described hereinbefore, there arises a problem that it is seriously difficult to realize an integration density and a chip size similar to those of the ordinary semiconductor integrated circuit elements.

SUMMARY OF THE INVENTION

In view of the aforementioned problems of the prior art, a first object of the present invention is to provide a light valve device such as a miniaturized active matrix liquid crystal device. To achieve the object, in the present invention thin film switching elements are formed by using the substrate having a multi-layered structure, in which a semiconductor single crystal thin film layer made by thinning a semiconductor single crystal wafer is formed on an electrical insulative substrate layer. In the prior art, there are known various types of semiconductor laminated substrates having the two-layered structure as is so-called the "SOI substrate". This SOI substrate is prepared by depositing a polycrystal silicon thin film on a substrate surface made of an insulating material, for example, by using the chemical vapor deposition process and then by executing a heating treatment and re-crystallizing the polycrystal film into a single crystallized structure by irradiating a laser beam. Generally speaking, however, the single crystal prepared by re-crystallizing a polycrystal does not always have a uniform azimuth, but rather has a high lattice defect density. For these reasons, it is difficult to apply the miniaturization technology like that applied to the silicon single crystal wafer to the SOI substrate fabricated by the process of the prior art. In view of this point, a second object of the present invention is to provide a light valve device of fine and high resolution by using a semiconductor single crystal thin film made by thinning a semiconductor single crystal wafer and having a crystal azimuth as uniform as that of the silicon single crystal wafer widely used in the semiconductor fabrication process and a lattice defect of as low density as the same.

BRIEF DESCRIPTION OF THE DRAWING

FIG. 8 is a graph showing a relation between leak current of drain and thickness of a silicon single crystal layer of the insulated gate transistor formed on the silicon single crystal layer;

FIGS. 9A and 9B are schematic sections showing additionally another embodiment of the integrated circuit chip substrate;

DETAILED DESCRIPTION OF THE INVENTION

Figure 1A:
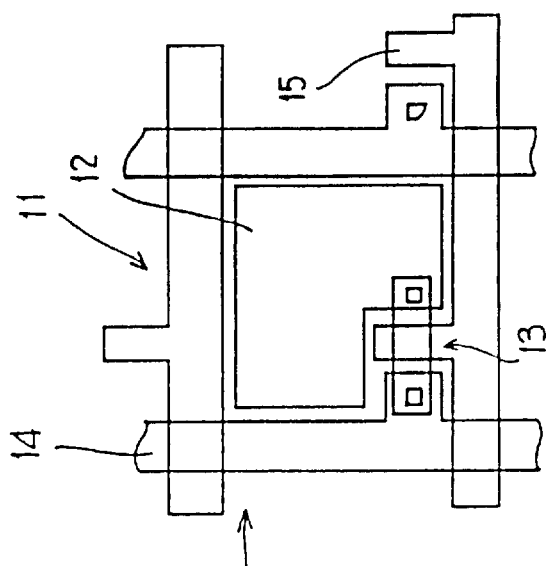
FIG. 1A is a top plan view of a substrate.
Figure 1C:
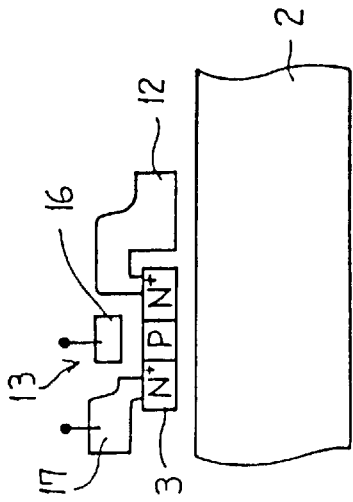
FIG. 1C is an enlarged top plan view showing an integrated circuit chip formed over the substrate.
Figure 1E:
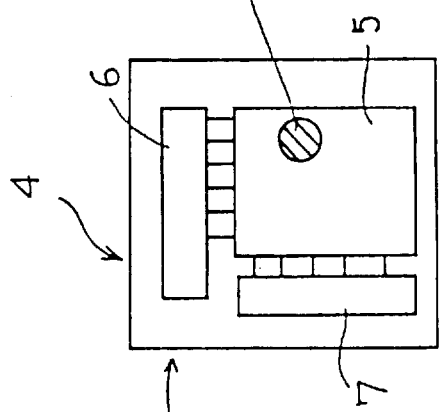
FIG. 1E is an enlarged top plan view showing a pixel formed in a pixel region of the integrated circuit chip.
Figure 1F:
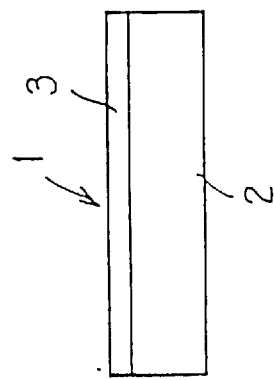
FIG. 1F is a schematic enlarged section showing the same pixel region.
Figure 1D:
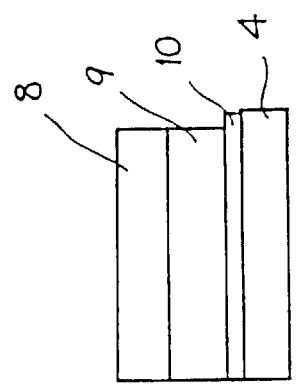
FIG. 1D is a schematic section showing a light valve device using the integrated circuit chip over the substrate.
Figure 1B:
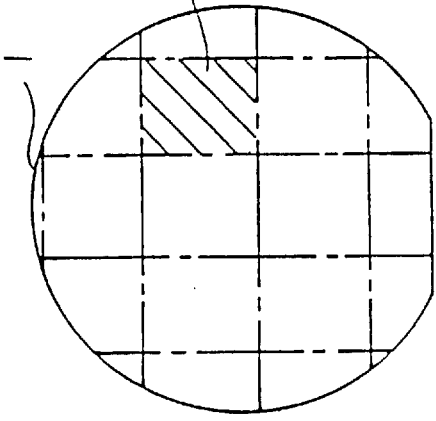
FIG. 1B is a schematic section showing the same substrate.

FIG. 1A shows a plane shape of the substrate 1 in the present invention and FIG. 1B shows its sectional structure. As shown, the substrate 1 has, for example, a wafer shape of 6 inches in diameter. The substrate 1 has the two-layered structure which is composed of a substrate layer 2 of, for example, quartz and a single crystal thin film layer 3 of, for example, silicon formed over the substrate layer 2. For example, driving circuits and pixel electrodes in an active matrix device are formed in every chip area by applying the miniaturization semiconductor production technology to the single crystal thin film layer 3 of the substrate 1.

FIG. 1C is an enlarged top plan view of an integrated circuit chip in the above process. As shown, an integrated circuit chip 4 is, for example, 1.5 cm in length of one side and an active matrix device is obtained that is remarkably small-sized in comparison with that of the prior art. The integrated circuit chip 4 comprises: a pixel region 5, in which insulated gate field effect transistors connected respectively to miniature pixel electrodes arranged in a matrix shape and the pixel electrodes are formed; an X driver region 6, in which a driving circuit, namely an X driver, for supplying an image signal to each transistor is formed; and a Y driver region 7, in which a scanning circuit for scanning each transistor element by non-interlace, namely, a Y driver is formed. According to the present invention, since the single crystal thin film of which carrier mobility is much greater than that of a amorphous thin film or a polycrystal thin film is formed, the X and the Y drivers necessary for high-speed response can be formed on the same face with the pixel region.

FIG. 1D is a section showing a high-speed miniature and remarkably high density active matrix type light valve device formed by using the above integrated circuit chip 4. As shown, the light valve device is composed of: an opposed substrate 8 opposed through a predetermined gap to the integrated circuit chip 4; and an electrooptical material layer, for example, a liquid crystal layer 9 filled up in the gap. An alignment film 10 for aligning a liquid molecule included in the liquid crystal layer 9 covers the surface of the integrated circuit chip 4. Individual pixel electrodes formed in the pixel region 5 of the integrated circuit chip 4 are selectively energized by turning on a corresponding transistor element and control a light transparent characteristic of the liquid crystal layer 9 to function as a light valve. Each pixel electrode can be about 1 μm in length so that a remarkably small sized active matrix liquid crystal device can be provided.

FIG. 1E is an enlarged top plan view of a portion of the pixel region 5 shown in FIG. 1C and shows one pixel. FIG. 1F is a schematic section of the same one pixel. As shown, a pixel 11 is composed of: a pixel electrode 12; a transistor 13 for energizing the pixel electrode 12 according to signals; a signal line 14 for supplying signals to the transistor 13; and a scanning line 15 for scanning the transistor 13. The signal line 14 is connected to the X driver 6 and the scanning line 15 is connected to the Y driver 7. The transistor 13 is composed of: a drain region, a source region and a channel region formed between both regions, which are formed in the single crystal thin film 3; and a gate electrode 16 formed through a gate insulator film on the channel region. That is to say the transistor 13 is of the insulated gate field effect type. The gate electrode 16 is composed of a portion of the scanning line 15, the pixel electrode 12 is connected to the source region and a drain electrode 17 is connected to the drain region. The portion of the signal line 14 is composed of the drain electrode 17.

As has been described above, the present invention uses a substrate having a multi-layered structure which is formed of at least an insulative substrate layer and a semiconductor single crystal thin film layer formed by thinning a semiconductor single crystal wafer. Further, the semiconductor single crystal thin film layer has the same quality as a wafer made of semiconductor single crystal bulk. Therefore switching elements which drive pixel electrodes and pixels can be integrated by applying miniaturization technology like to that applied to the semiconductor single crystal thin film layer. The integrated circuit chip obtained by the above process has a remarkably high pixel density and a remarkably small pixel size, and can compose a microminiature and very small sized light valve device, such as, an active matrix liquid crystal device.

Figure 2:
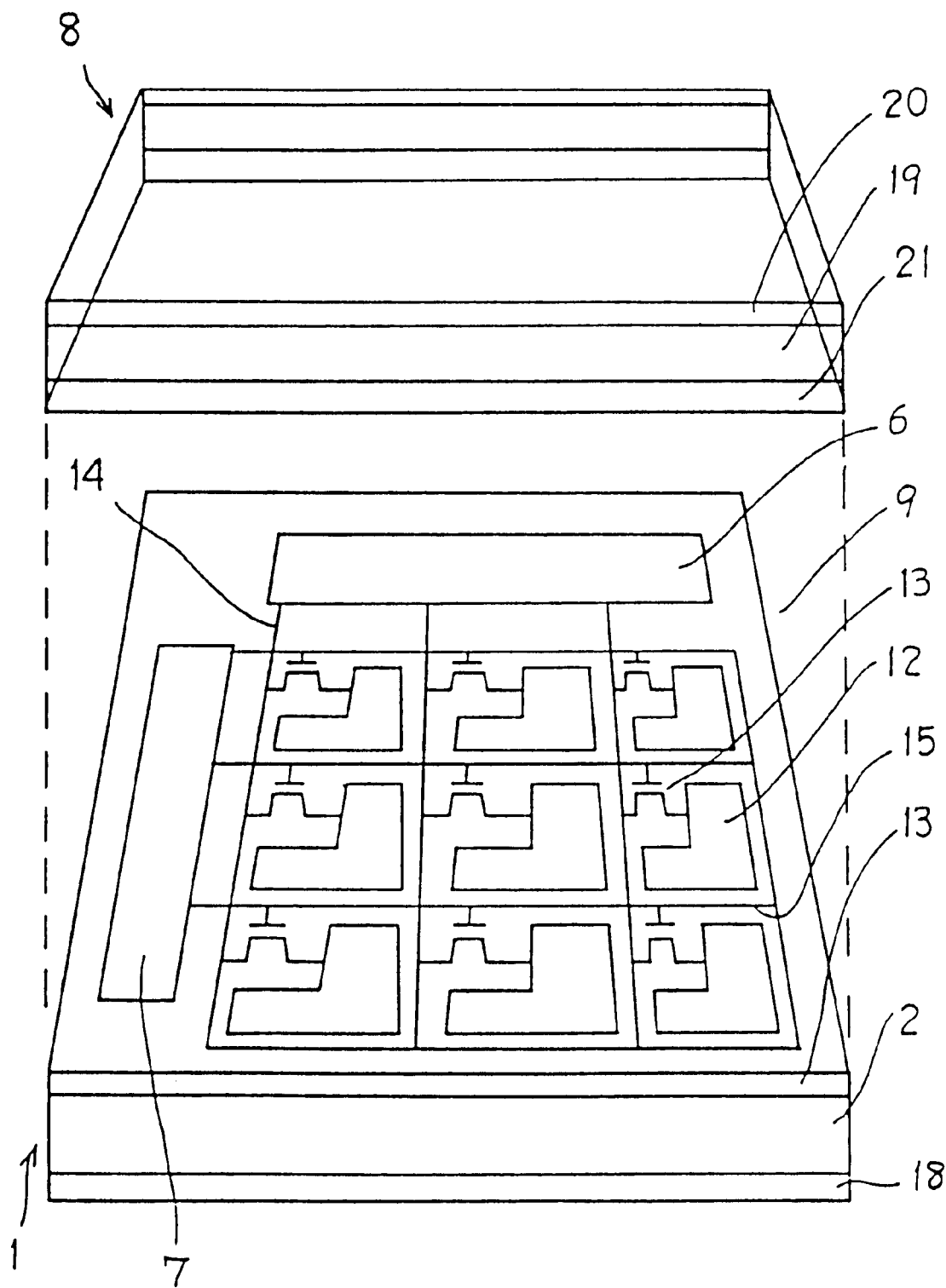
FIG. 2 is an exploded schematic perspective view showing one embodiment of the light valve device.

A preferred embodiment of the present invention will be described in detail with reference to the accompanying drawings. FIG. 2 is a schematic exploded perspective view showing one embodiment of the light valve device according to the present invention. As shown, this light valve device is composed of: a drive substrate 1; an opposed substrate 8 opposed to the drive substrate; and an electrooptical material layer, for example a liquid crystal layer 9, arranged between the drive substrate 1 and the opposed substrate 8. The drive substrate 1 is formed with: a pixel electrode or drive electrode 12 for defining a pixel; and a driving circuit for exciting the drive electrode 12 in response to a predetermined signal.

The drive substrate 1 has a multi-layered structure which is composed of at least a substrate layer 2 of quartz and a single crystal silicon semiconductor film layer 3. In addition, a polarizing plate 18 is adhered to the back of the quartz substrate layer 2. Moreover, the driving circuit and pixel transistors are in the single crystal silicon semiconductor film layer 3. This integrated circuit includes a plurality of pixel transistors comprising insulated gate field effect transistors 13 arranged in a matrix shape. Each transistor 13 has its source electrode connected with the corresponding pixel electrode 12, its gate electrode connected with a scanning line, and its drain electrode connected with a signal line 14. The integrated circuit further includes an X-driver 6 which is connected with the column signal line 14. Further included is a Y-driver 7 which is connected with the row scanning line 15. On the other hand, the opposed substrate 8 is composed of: a glass substrate 19; a polarizing plate 20 adhered on the outer face of the glass substrate 19; and an opposed or common electrode 21 formed on the inner face of the glass substrate 19.

Figure 3A:
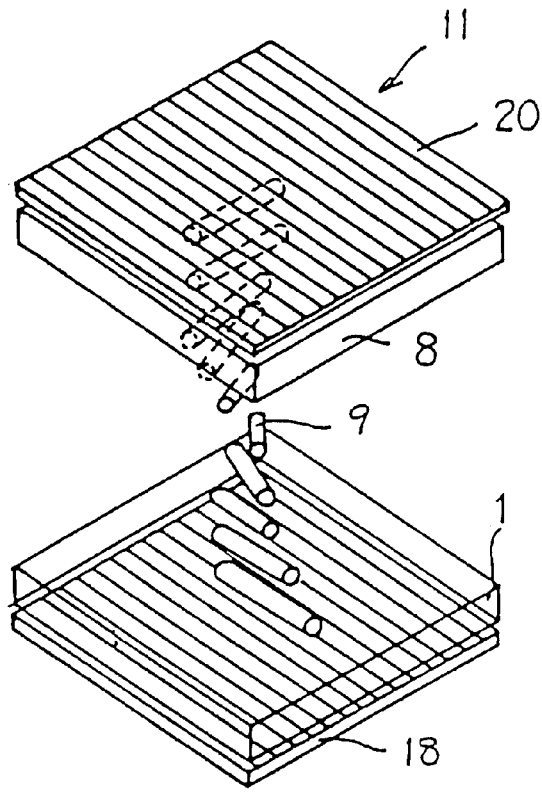
FIGS. 3A and 3B are exploded schematic perspective views showing movements of individual pixels.
Figure 3B:
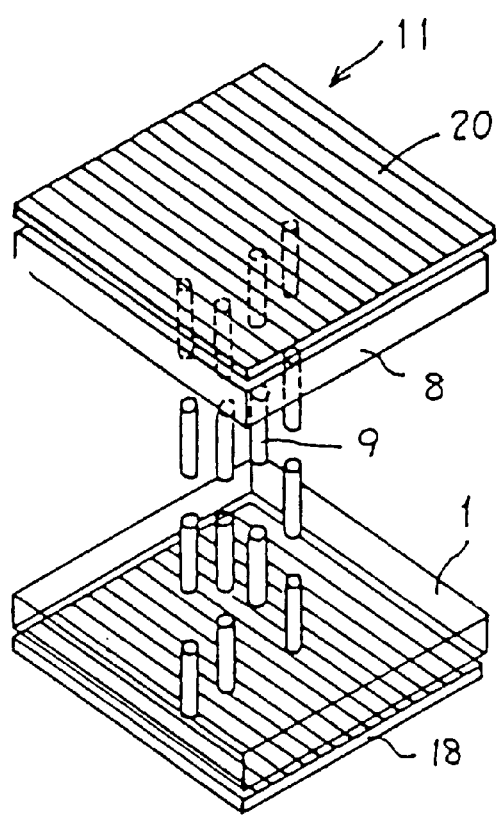

FIG. 3 is a schematic perspective view showing one pixel extracted from the light valve device shown in FIG. 2. FIG. 3A shows that a pixel 11 is unselected and FIG. 3B shows that the pixel 11 is selected. In the present embodiment, a liquid crystal layer 9 used is exemplified by a nematic liquid crystal material. Nematic liquid crystal molecules are characterized to have their longitudinal axes aligned easily. An alignment of the liquid crystal molecules can be gained by carrying out rubbing treatment to the inner surfaces of the drive substrate 1 and the opposed substrate 8. As shown, since the upper and lower substrates have different rubbing directions of 90 degrees, the liquid crystal molecules are accordingly turned by 90 degrees. As a result, a polarizing axis of the light to pass through the liquid crystal layer 9 is turned by 90 degrees. If an electric field is applied between the pixel electrode formed on the surface of the drive substrate 1 and the opposed electrode formed on the inner face of the opposed substrate 8, on the other hand as shown in FIG. 3B, the liquid crystal molecules are aligned in the direction of electric field, i.e., at a vertical direction to the substrate so that the optical rotatory power is lost. This transition is optically detected by a pair of polarizing plates 18 and 20 which are arranged above and below the liquid crystal layer.

In other words, the light to transmit through the liquid crystal layer is passed or shielded depending upon whether or not the voltage is applied. Thus, the light valve device according to the present invention has the light valve function for each pixel.

Figure 4:
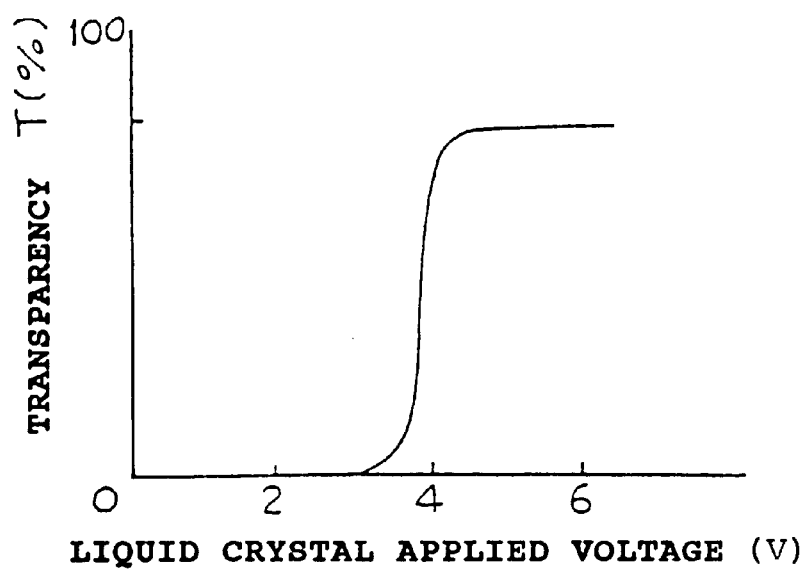
FIG. 4 is a graph showing the relation between a liquid crystal applied voltage and transparency.

FIG. 4 is a graph showing the relation between the applied voltage to the liquid crystal composing the pixel shown in FIG. 3 and the transparency of the liquid crystal layer. As shown, the voltage of threshold voltage (4 V) or more is applied between the opposed electrode and the pixel electrode, so that the transparency of the liquid crystal layer extremely changes from light shielding state to light transmittance state. The applied voltage to the pixel can be carried out by controlling the conductivity of the pixel transistor element connected with the pixel electrode.

Next, the operations of the aforementioned embodiment will be described in detail with reference to FIGS. 2 to 4. Each pixel transistor element 13 has its gate electrode connected with the scanning line 15 so that the individual transistor elements 13 are turned on or off in the order of the lines which are fed with the scanning signal by the Y-driver 7. A display signal to be outputted from the X-driver 6 is fed through the signal line 14 to the selected pixel transistor 13 in the conductive state. The display signal thus fed is transmitted to the corresponding pixel electrode 12 to excite the pixel electrode so that the liquid crystal layer 9 is operated to have a transparency of substantially 100%. On the other hand, the transistor element 13 is rendered inconductive, when unselected, to hold the display signal written in the pixel electrode as charges. Incidentally, the liquid crystal layer 9 has a high specific resistance and usually operates to have a capacitance. These drive transistor elements 13 use ON/OFF current ratios for expressing the switching performance. The current ratios necessary for the liquid crystal operations can be easily determined from the write time and the hold time. In case the display signal is a TV signal, for example, its 90% or more of the pixel electrode charge for one scanning period of about $60\mu$ secs has to be written. On the other hand, 90% or more of charges have to be held for one field period of about 16 $\mu$secs. As a result, the current ratio must have five figures or more. At this time, the drive transistor elements can retain six figures or more of ON/OFF ratio because they are formed over the single crystal silicon semiconductor film layer 3 having a remarkably high charge mobility and small defect density. Thus, it is possible to provide an active matrix type light valve device having a remarkably high signal responsiveness. Simultaneously with this, the peripheral driving circuits 6 and 7 can be formed over the common silicon single crystal semiconductor film by making use of the high mobility of the single crystal thin film.

With reference to FIG. 5 the process for fabricating the substrate for the light valve device of semiconductor chip type, in which the pixel electrode, pixel transistor and the driving circuit are integrated, will be described in detail in the following. At a first step shown in FIG. 5A, there are prepared, at least, the quartz substrate 2 and the single crystal silicon semiconductor substrate 22. The single crystal silicon semiconductor substrate 22 is preferably exemplified by a silicon wafer of high quality used in the LSI fabrication and has a crystal azimuth in a uniform range of <100>0.0±1.0 degree and a single crystal lattice defect density of 500/cm$^2$ or less. The prepared quartz substrate 2 and the single crystal silicon semiconductor substrate 22 have their surfaces precisely finished at first. Subsequently, the two substrates are thermo-compressively bonded by superposing and heating the two polished surfaces. As a result of this thermo-compressive bonding treatment, the two substrates 2 and 22 are fixedly bonded. At a step shown in FIG. 5B, the surface of the single crystal silicon semiconductor substrate is polished. As a result, the quartz substrate 2 is formed on its surface with a single crystal silicon semiconductor film layer 3 polished to a desired thickness. The substrate 1 for driving, which has the multi-layered structure composed with at least the substrate layer 2 comprising the quartz substrate, and the single crystal silicon semiconductor film layer 3, can be provided. An example of a multi-layered starting substrate with more than two layers will be described later. In order to thin the single crystal silicon semiconductor substrate 22, the polishing treatment can be replaced by a etching treatment. Since the single crystal silicon semiconductor film layer 3 thus obtained retains substantially the quality of the silicon wafer 22 as it is, it is possible to obtain a substrate material which is remarkably excellent in the uniformity of crystal azimuth and the lattice defect density. On the other hand, as conventionally effected, the single crystal thin film obtained by re-crystallizing the deposited amorphous or polycrystal silicon thin film is not suited for the LSI fabrication, because the single crystal thin film has the lattice defect which is frequent and the crystal azimuth which is not uniform.

Figure 5A:
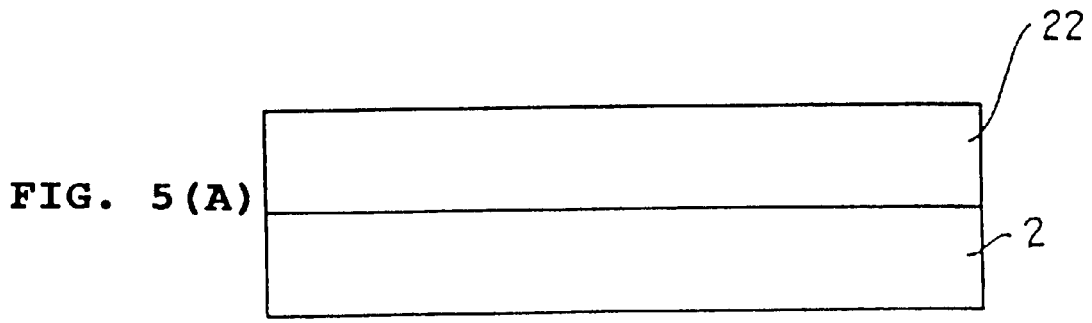
FIGS. 5A to 5H are process charts showing one embodiment of the method for producing a semiconductor integrated circuit chip.
Figure 5B:
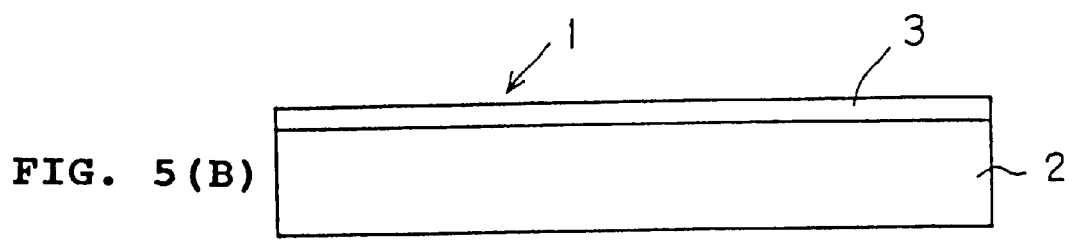
Figure 5C:
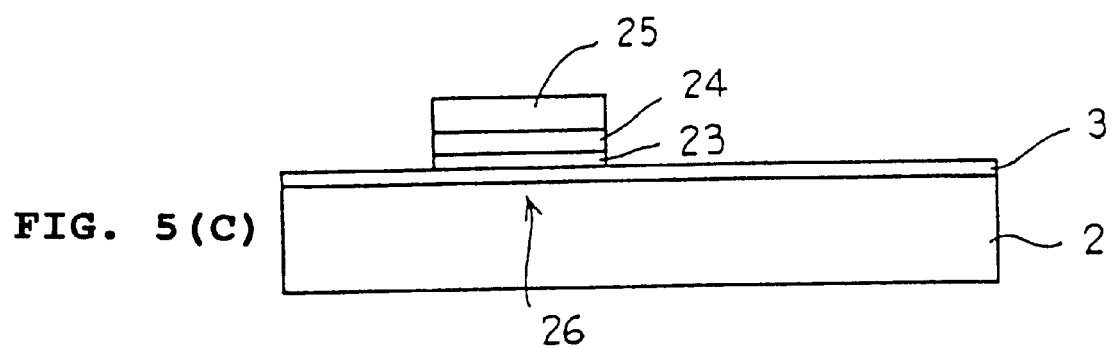

At a step shown in FIG. 5C, the surface of the single crystal silicon semiconductor film layer 3 is subjected to thermal oxidation, so that a silicon oxide film 23 is formed over all the surface. A silicon nitride film 24 is deposited on the silicon oxide film 23 by using the chemical vapor deposition. Further a photo resist 25 is covered over the silicon nitride film 24. The photo resist 25 is patterned by a photo-lithography and is removed while on a device region 26, it remains. A portion of the silicon oxide film 23 and the silicon nitride film 24 are not covered with the photo resist 25. In this state, the portion is removed by a etching treatment. FIG. 5C shows the result of processing the substrate for driving with the above method.

Figure 5D:
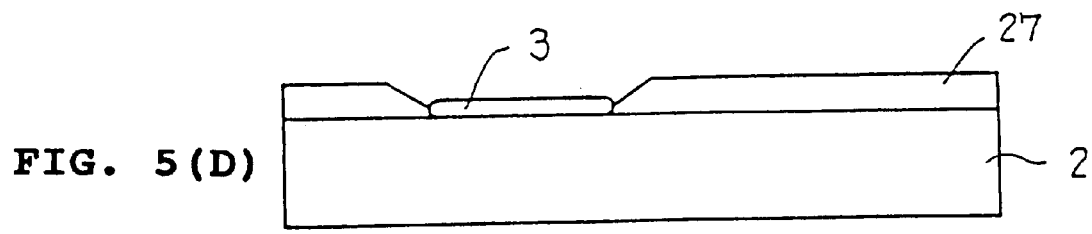

At a step shown in FIG. 5D, after removing the photo resist 25, the single crystal silicon semiconductor film layer 3 is subjected to thermal oxidation by using the silicon oxide film 23 and the silicon nitride film 24 which cover the device region 26 as a mask. As a result, a field oxide film 27 is formed. In the region surrounded by the field oxide film 27, the single crystal silicon film layer 3 is left, then the device region 26 is formed. In this state the silicon oxide film 23 and the silicon nitride film 24 used as a mask are removed.

Figure 5E:
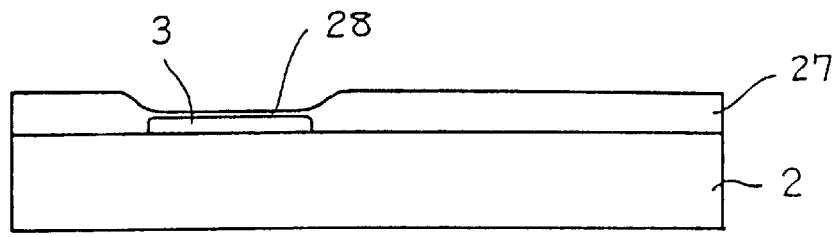

At a step shown in FIG. 5E, the single crystal silicon film layer 3 is again subjected to oxidation, thereafter a gate oxide film 28 is formed over the surface.

Figure 5F:
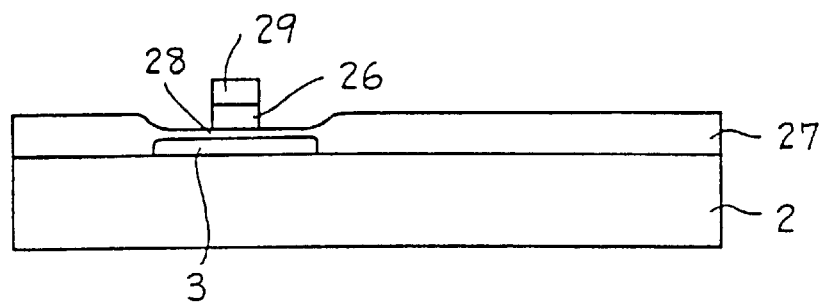

At a step shown in FIG. 5F, a polycrystal silicon film is deposited by the chemical vapor deposition. The polycrystal silicon film is selectively etched by using the photo resist 29 patterned to the desired shape, so that a gate electrode 16 comprising the polycrystal silicon film is formed on the gate oxide film 28.

Figure 5G:
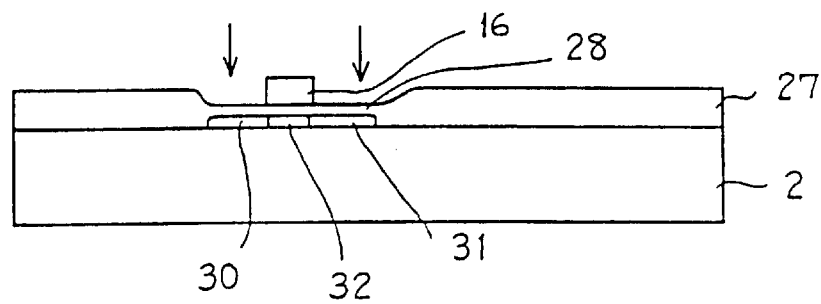

At a step shown in FIG. 5G, after removing the resist 29 an arsenic impurity is implanted by ion implantation using the gate electrode 16 as a mask through the gate oxide film 28, so that a drain region 30 and a source region 31 are formed in the silicon single crystal film 3. As a result, the transistor channel forming region 32, which is not implanted by the arsenic impurity, is provided between the drain region 30 and the source region 31 below the gate electrode 16.

Figure 5H:
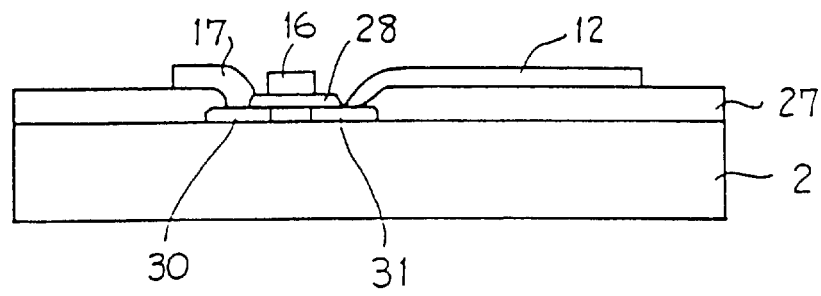

At last at a step shown in FIG. 5H, a portion of the oxide film 28 on the drain region 30 is removed to form a contact hole there. The drain electrode 17 is connected with the contact hole. Similarly a portion of the oxide film 28 on the source region 31 is removed to form a contact hole. A drive electrode 12 is formed so as to cover the contact hole, for electrical connection to the source region. The drive electrode or pixel electrode 12 is composed with a transparent electrode comprising an ITO(Indium Tin Oxide) and so on. In addition, a field oxide film 27 arranged under the pixel electrode 12 is also transparent, further the quartz substrate 2 arranged under the field oxide film 27 is also transparent. The three-layered structure comprising the drive electrode 12, the field oxide film 27 and the quartz substrate 2 is optically transparent, therefore a transparent light valve device can be provided.

In the method of producing shown in FIG. 5, as described above, it is possible to form the insulated gate field effect transistor having a size of micron order or sub-micron order, by executing the insulator film forming treatment using high-temperature to the single crystal silicon film of high quality, a photolithography and etching of a high resolution and an ion implantation treatment. The silicon single crystal film used is extremely high quality, therefore the insulated gate transistor obtained has an excellent electrical characteristic. Further, a pixel electrode having a size of micron order can be formed by the miniaturation technology, therefore a semiconductor integrated circuit chip substrate for an active matrix liquid crystal device, which has high density and miniature structure, can be produced.

Figure 6:
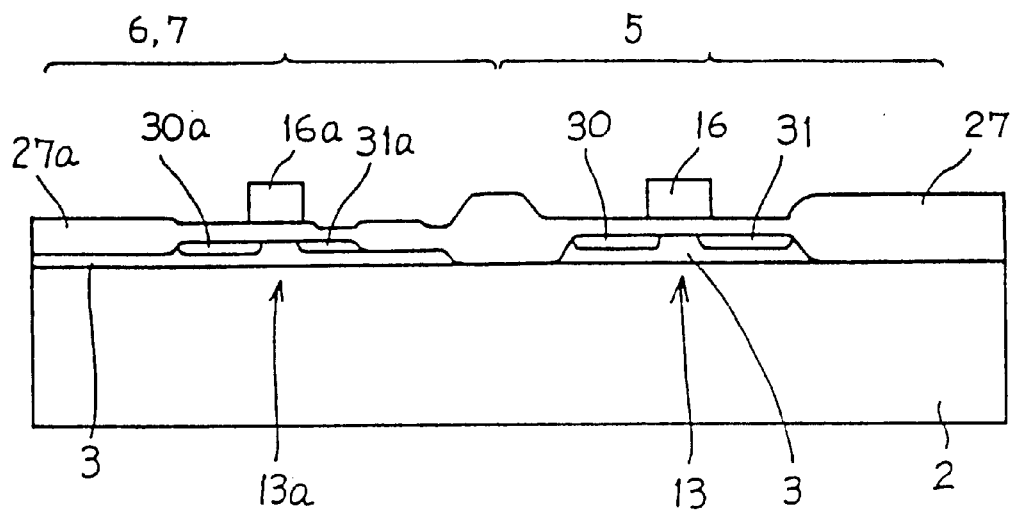
FIG. 6 is a schematic section showing another embodiment of a semiconductor integrated circuit chip substrate.

FIG. 6 is a schematic section showing another embodiment of the inventive semiconductor integrated circuit chip for the light valve device. As shown the integrated circuit chip comprises a pixel region 5, a drive region 6 and a drive region 7 on the substrate 2. In the pixel region 5, a pixel electrode which is not shown in the figure and a pixel insulated gate transistor element 13 connected to a pixel electrode are formed. The transistor 13 comprises a source region 30 and a drain region 31 formed in a silicon single crystal film 3, and a gate electrode 16 arranged on a gate insulator film over the silicon single crystal film. The region which the transistor 13 is formed is surrounded by a field oxide film 27.

On the other hand, the drive regions 6 and 7 are positioned apart from the pixel region 5 and include an insulated gate transistor 13a as the component. The transistor 13a comprises a source region 30a and a drain region 31a formed in the common silicon single crystal film 3, and a gate electrode 16a arranged on a gate insulator film. The region in which the transistor 13a is formed is equally surrounded by a field oxide film 27a. As apparent from the figure the pixel insulated gate transistor 13 in the pixel region 5, and the insulated gate transistor 13a in the drive regions 6 and 7 are formed in the common silicon single crystal film 3 at the same time.

A light transparent type light valve device commands that the incident light to the pixel electrode region 5 should be passed or shielded. Therefore, the pixel electrode region 5 must be transparent to the incident light. After the perfect thermal oxidation treatment, all the silicon single crystal film in the pixel electrode region 5 is changed to the field oxide film 27. In other words, the field oxide film 27 which comprises silicon dioxide is transparent, and the single crystal silicon film 3 which is left only in the device region is opaque. On the other hand, the drive regions 6 and 7 are not relative to the light valve function, but it is preferable that they are shielded from the incident light, because the influence of the incident light prevents the insulated gate transistor 13a from operating normally. In the embodiment shown in FIG. 6 the field oxide film 27a formed in the drive regions 6 and 7 is obtained by thermally oxidizing only the upper part of the silicon single crystal film 3. The silicon single crystal film 3 is left under the field oxide film 27a. As described above, as the silicon single crystal film 3 is opaque, the incident light can be effectively shielded.

Figure 7:
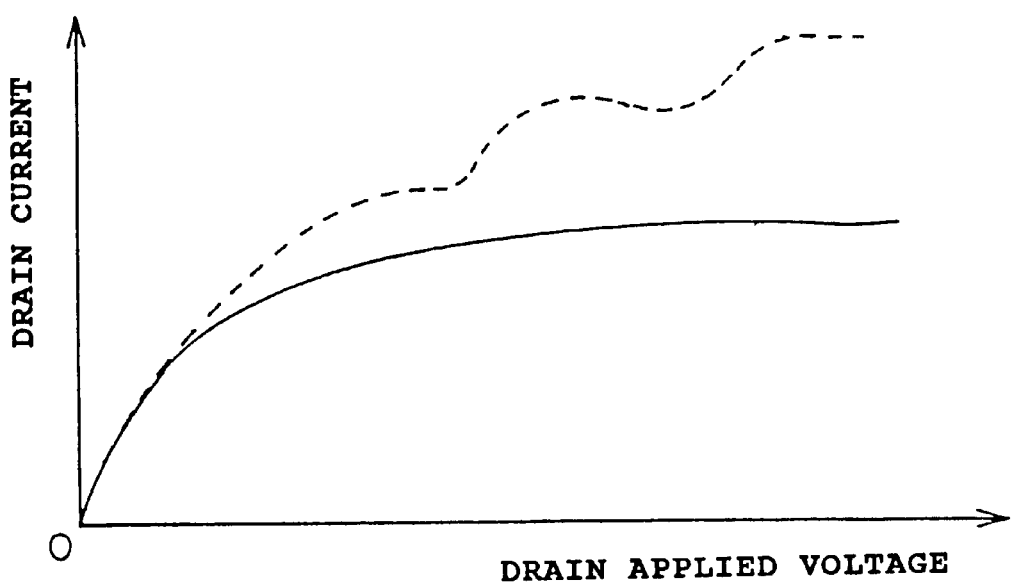
FIG. 7 is a graph showing the relation between drain voltage and drain current of an insulated gate transistor.

FIG. 7 is a graph showing the relation between the drain current and drain applied voltage of the insulated gate transistor formed in the silicon single crystal film. A solid line shows the case that a semiconductor under a forming channel region is connected to the ground (Fixed DC potential), that is, in a non-floating condition. A broken line shows the case that a semiconductor under the channel forming region is not connected to the ground, that is, in a floating condition. Apparent from the figure, when the semiconductor under the channel forming region is connected to the ground, that is, floating, to stabilize its electric potential, the stable operation of the transistor which can obtain the ideal saturation characteristic of the drain current to the drain applied voltage can be provided.

On the other hand, since the electric potential is unstable in the case that the semiconductor under the channel forming region is not connected to the ground, the drain current is not fixed to the drain applied voltage. The semiconductor under the forming channel region is connected to the ground in the embodiment shown in FIG. 6. As described above, since the silicon single crystal film can be provided by a polishing process according to the inventive preferred embodiment, the desired film thickness can be obtained, so that the semiconductor under the channel forming region is easily connected to the ground. The connection may be done only to the insulated gate transistor formed in the drive regions or to the transistor formed both in the drive regions and in the pixel region.

FIG. 8 is a graph showing the relation between leak current of drain of the insulated gate transistor formed in the silicon single crystal film and the silicon single crystal film thickness. The leak current of drain shows a high voltage of the leak current which flows through the channel region in the case of applying the drain voltage to the transistor in the non-conductivity state. As shown in the figure, the leak current of drain is not dependent on the silicon single crystal film thickness in the state that the incident light is not irradiated. However, in the case of irradiating the incident light of 3000 lux, for example, the leak current of drain rises with increase in thickness. The leak current of drain needs to be held down because of aggravating an ON/OFF current ratio of the transistor. FIG. 8 indicates that in order to keep the ON/OFF ratio more than $10^6$, the thickness must be less than 5000 Å, because the drain leakage current should be less than $10^{-10}$ Å, to keep the ON/OFF ratio $10^6$ for the "on" drain current on the order of 100 $\mu$A.

Especially, the transistor formed in the pixel region needs to take measures because of receiving irradiation of the incident light. Therefore, it is preferable to establish the silicon single crystal film thickness existed in the pixel region which is thinner than the silicon single crystal film thickness existed in the drive region. The thickness can be easily controlled by selective etching and so on. Especially, as the drain leak current value of the silicon single crystal layer under illumination is higher than that of a silicon amorphous layer or a silicon polycrystal layer, the measure for thinning the silicon single crystal film thickness is important in practical use.

FIG. 9 is a schematic section showing another embodiment of the inventive integrated circuit chip substrate. FIG. 9A shows a section of starting substrate and FIG. 9B is a section showing that an insulated gate transistor is completely formed in the starting substrate. The starting substrate has the structure that a low resistance thin film layer 33 is sandwiched between a quartz substrate layer 2 and a single crystal silicon film layer 3. The low resistance thin film layer 33 comprises, for example, a silicon polycrystal thin film doping an impurity. For producing the starting substrate, at first the low resistance thin film layer 33 is deposited on the quartz substrate layer 2 to thermo-compressively bond a single crystal silicon wafer on the low resistance thin film layer 33.

Further the single crystal silicon film layer 3 having the desired film thickness can be obtained by polishing the single crystal silicon wafer.

In the two-layered structure of the single crystal silicon film layer 3 and the low resistance thin film layer 33, an insulated gate transistor is formed by the same method with a process shown in FIG. 5. The transistor comprises a source region 30, a drain region 31, a channel forming region 32 which is formed between the source region 30 and the drain region 31 and a gate electrode 16 provided through the gate oxide film 28 above the channel forming region 32. The device region is surrounded by a field oxide film 27. A low resistance region 34 is existed under the channel forming region 32. The low resistance region 34 can be obtained from the low resistance thin film layer 33. The above structure makes it possible to connect the channel forming region of the insulated gate transistor to a fixed electric potential point to stabilize the operations of the insulated gate transistor.

Figure 10:
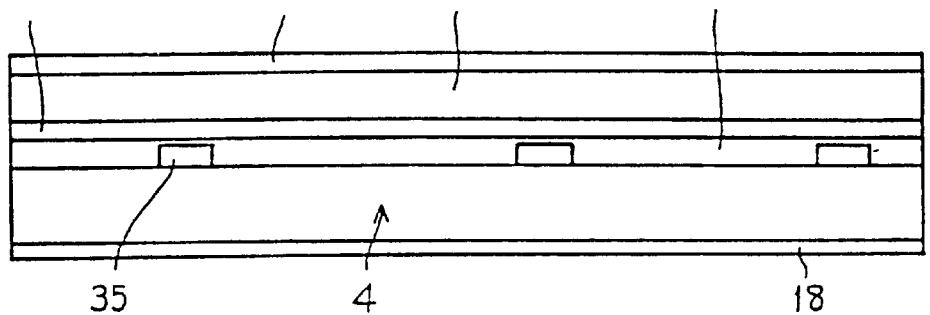
FIG. 10 is a schematic section showing another embodiment of the light valve device.

FIG. 10 is a schematic section showing another embodiment of the inventive active matrix type light valve device. In the present light valve device, an integrated circuit chip substrate 4 is used. The integrated circuit chip substrate 4 includes the circuit elements such as the pixel electrode and the switch transistor which are micro-fabricated in the silicon single crystal thin film layer, as described above. Further, a spacer 35 is formed on the surface of the integrated circuit chip substrate 4. The spacer 35 is formed on the integrated circuit chip substrate 4 by the film forming technology and the miniature patterning technology which are used in the semiconductor fabrication. A thickness of the spacer 35 can be controlled very accurately. For example, when a nematic liquid crystal is used, the thickness of the spacer 35 is set for 10 $\mu$m. When a ferroelectric liquid crystal is used the thickness of the spacer 35 is set for 1 $\mu$m. An opposed substrate 8 is provided adjacent the spacer 35 over the integrated circuit chip substrate 4. Then, a liquid crystal layer 9 is filled up in the gap between both substrate, which are set by the thickness of the spacer 35. At last, a polarizing plate 18 adheres to the outer surface of the integrated circuit chip substrate 4 and another polarizing plate 20 adheres to the outer surface of the opposed substrate 8. A pair of the polarizing plates 18 and 20 are for optically detecting the change of a molecular alignment of the liquid crystal layer 9.

Figure 11:
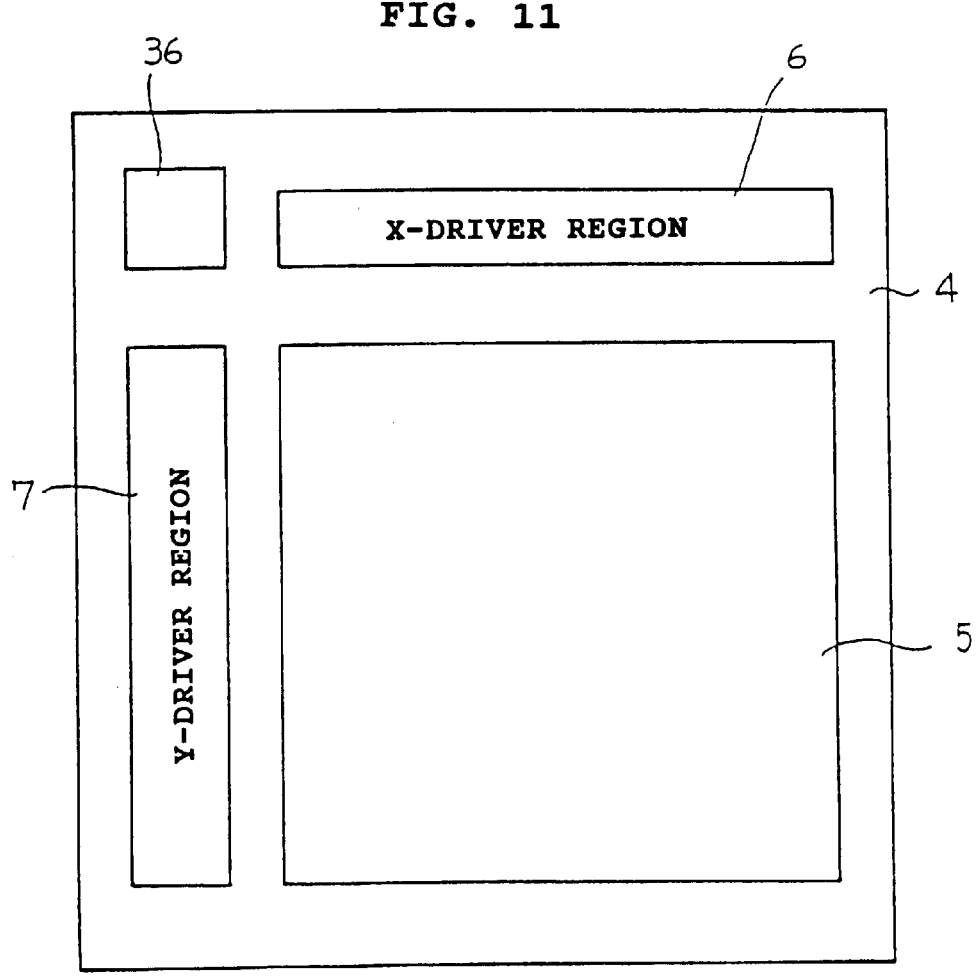
FIG. 11 is a schematic top plan view showing additionally another embodiment of the integrated circuit chip substrate.

FIG. 11 is a schematic top plan view showing additionally another embodiment of the inventive integrated circuit chip substrate for the light valve. The present integrated circuit chip 4 comprises a pixel region 5, an X-drive region 6 and a Y-drive region 7 in the same way as the above embodiment. Additionally comprising a video signal processing circuit region 36. The video signal processing circuit formed in the region 36 is for processing an image signal or a video signal which are input from an external signal source and supplying the processed signals to the X-drive region 6. As described above, because of using the silicon single crystal thin film in the present invention, the video signal processing circuit can be formed by using the semiconductor micro-fabrication process technology at the same time in addition to a signal circuit or a scanning circuit which are formed in the drive region for the pixel electrode drive. Therefore, it is possible to form integrally an additional circuit having the function of a LSI scale on the integrated circuit chip substrate 4 freely. When the light valve device or the display device is composed by using the integrated circuit chip 4 shown in the FIG. 11, a small-sized display device used for so many purposes can be obtained because the devices can directly connect with the external video signal source. Besides the video signal processing circuit, for example, a memory circuit, a circuit for IC examination, a sensor circuit can be additionally integrated.

Lastly, an applied example of the inventive active matrix type light valve device will be decribed in brief according to the figures.

Figure 12:
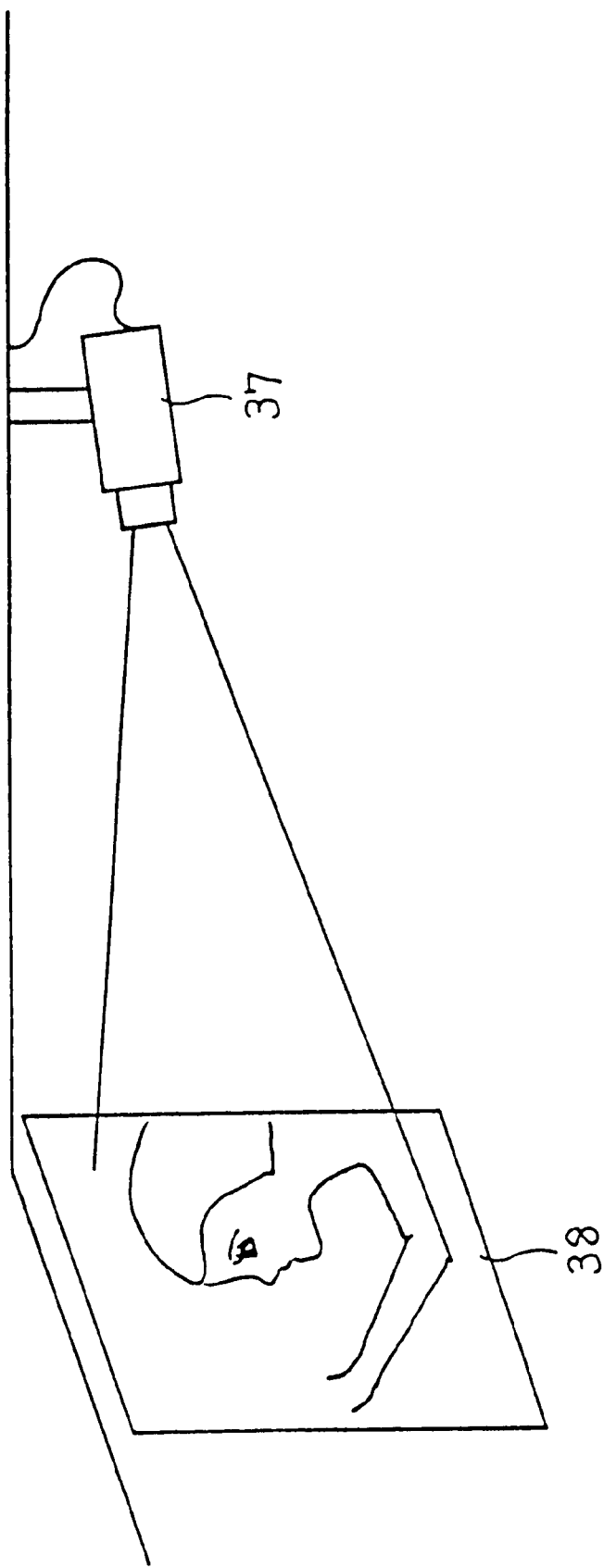
FIG. 12 is a schematic perspective view of a video projector which applies the light valve device.

FIG. 12 is an applied example as a video projector. A video projector 37 includes a microminiature light valve device comprising the integrated circuit chip substrate shown in FIG. 11. In this light valve device primary image is displayed in accordance with the video signals to be enlarged by using an optical projection system, so that greatly magnified secondary image 38 is projected and displayed on the screen. An example shown in the figure is a small-sized pendent projector. As described above as the inventive active matrix type light valve device have the microminiature sizes of the order of centimeters, the video projector itself can be extremely miniaturized in comparison with the prior projectors. Though the sizes of the light valve device are extremely small, the pixel region formed comprises very miniature pixel of very high density. Therefore high-quality secondary projection image of high vision class can be obtained when the device is enlarged and projected.

Figure 13:
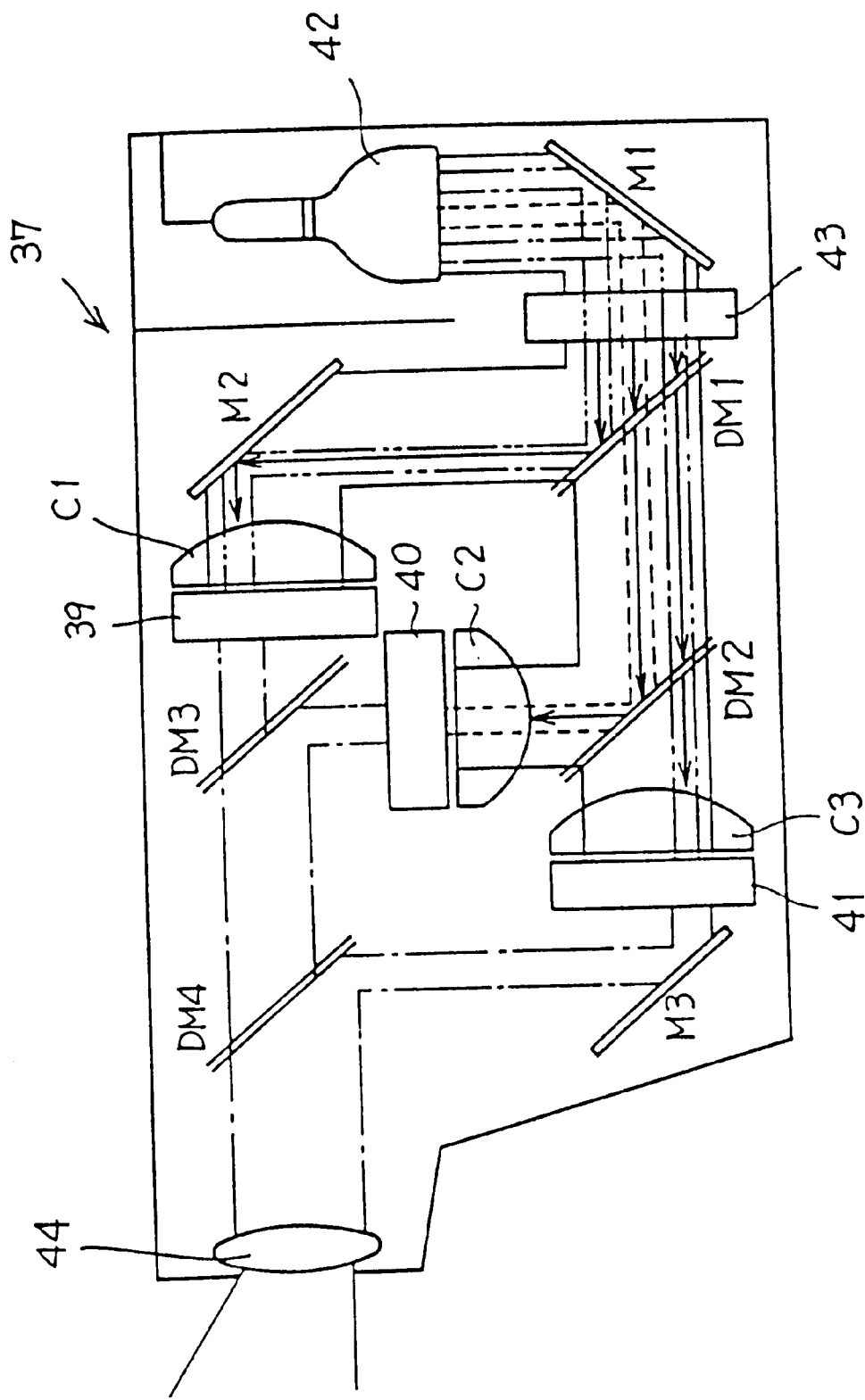
FIG. 13 is a schematic section showing the detailed structure of the video projector.

FIG. 13 is a schematic enlarged section showing a video projector 37 shown in FIG. 12. The video projector 37 has three active matrix transparent type light valve devices 39 to 41 packaged therein. A white light emitted from a white light source lamp 42 is reflected by a reflecting mirror M1 and is resolved into red, blue and green colors by a trichromatic resolving filter 43. The red light, which is selectively reflected by a dichroic mirror DM1, is reflected by a reflecting mirror M2 and is condensed into the first light valve device 39 by a condenser lens C1. The red light, which has been modulated by the light valve device 39 in accordance with the video signals, is allowed to pass through the dichroic mirrors DM3 and DM4, is enlarged and projected on the front through a magnifying lens 44. Likewise, the blue light having passed through the dichroic mirror DM1 is selectively reflected by a dichroic mirror DM2 and is condensed by a condenser lens C2 until it goes into the second light valve device 40. The blue light is modulated by the second light valve device 40 in accordance with the video signal and is then guided into the common magnifying lens 44 through dichroic mirrors DM3 and DM4. Moreover, the green light is passed through the dichroic mirrors DM1 and DM2 and is then condensed by the condenser lens C3 until it is guided into the third light valve device 41. The green light is modulated by the third light valve device in accordance with the video signal and is reflected by the reflecting mirror M3 and the dichroic mirror DM4 so that it is guided into the magnifying lens 44. The three primary colors thus individually modulated by the three light valve devices are finally composed and projected in an enlarged secondary image on the front by the magnifying lens 44. The light valve devices used have sizes of the order of centimeters so that the various optical parts and the white lamps can be accordingly small-sized. As a result, the video projector 37 can have its shape and size made far smaller in its entirety than that of the prior art.

Figure 14:
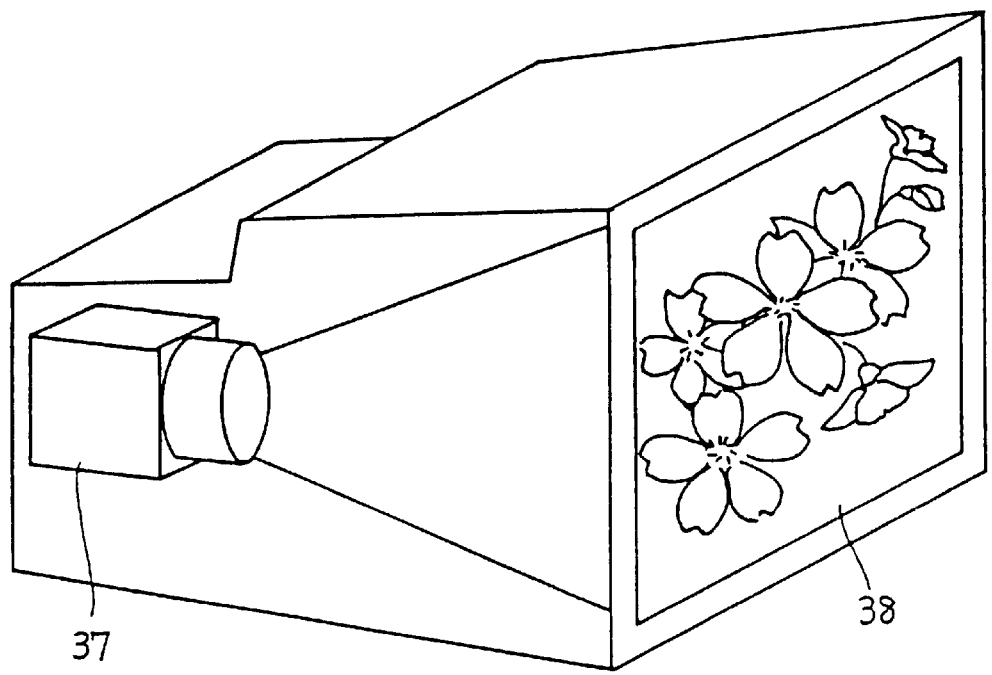
FIG. 14 is a schematic perspective view of a projection CRT including the video projector.

FIG. 14 is a schematic perspective view showing an embodiment, in which the video projector 37 shown in FIG. 13 is used as an alternate of a projection CRT. In this projection system, a screen forming the TV frame is irradiated from the back by the video projector 37 to project an enlarged secondary image 38 on the TV screen. This projection system has a super-high resolution and a high luminance. Moreover, the projection system can form a completely flat frame and has a remarkably light weight.

Figure 15:
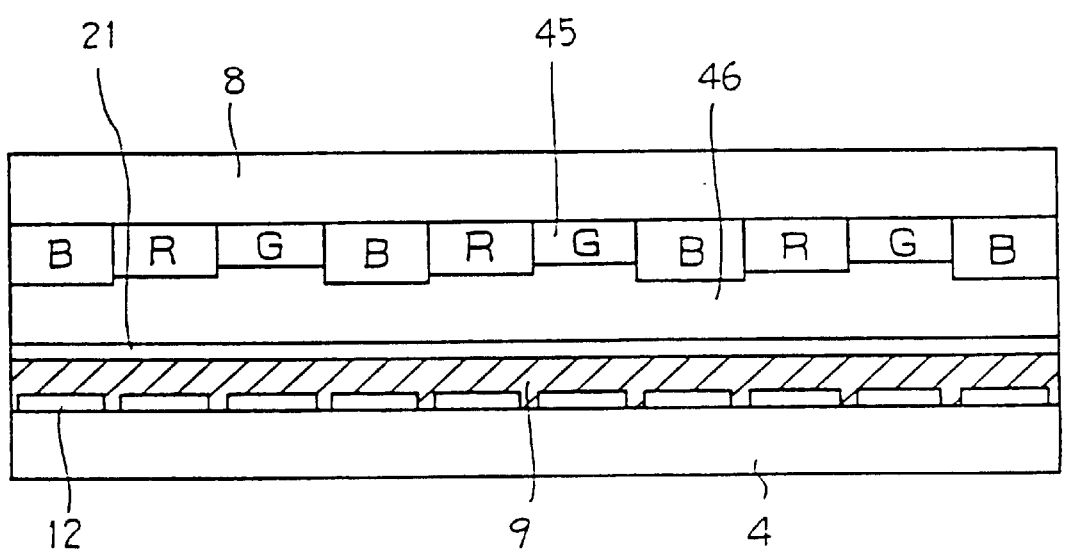
FIG. 15 is a schematic section showing an example in which the integrated circuit chip substrate is applied to a color active matrix display device.

Finally, FIG. 15 is a schematic section showing an applied example, in which an integrated circuit chip substrate according to the present invention is used to constitute a color display device. A plurality of pixel electrodes 12 are formed over the integrated circuit chip substrate 4. Over this integrated circuit chip 4, there is superposed an opposed glass substrate 8 through a predetermined gap. This gap between the two substrates is filled up with a liquid crystal layer 9. The opposed glass substrate 8 is formed in its inner surface with a three-primary color filter 45. The color filter 45 is divided into elements corresponding to the pixel electrodes 12. The color filter 45 is coated with an over coating 46. The over coating 46 is formed thereover with a common electrode 21. Thanks to this structure, the liquid crystal layer 9 is sandwiched between the common electrode 21 and the pixel electrodes 12 and is selectively driven by the electric field. The process for forming the color filter 45 used is exemplified by a dying process which has a high color purity and an excellent pattern precision. This dying process is accomplished by dying an organic substrate selectively with red, green and blue dye stuffs by the photolithographies of three times.

Moreover, the color display device can also be achieved by forming the three-primary color filters on the pixel electrodes 12 over the integrated circuit substrate 4 by the electrolytic deposition. Possibility of use of the invention As described hereinbefore, according to the present invention, the light valve device is formed by using an integrated circuit chip substrate, in which a pixel electrode and a drive circuit are integrated by applying semiconductor micro-fabrication technology to a semiconductor single crystal thin film layer formed over a substrate layer. As a result, there arises seven effects as follows:

a light valve device having a remarkably high pixel density can be provided;

it is possible to provide a remarkably small-sized light valve device which is as small as a semiconductor IC chip;

it is possible to provide a remarkably high-precise light valve device, in which a pixel is produced by the semiconductor micro-fabrication technology;

it is possible to easily add a circuit having a variety of functions matching the LSI since each elements can be formed by the integrated circuit technology for the single crystal bulk wafer layer;

as integrated circuit chips can be provided by dividing the wafer, only a portion of the chip deteriorates by a localized defect of wafer so that the total yield can rise in comparison with that of the prior and the cost can be lower;

to apply high temperature micro-fabrication process by using the single crystal thin film layer can improve the miniaturization of each circuit element; and not only pixel transistors, but a drive circuit and its protection circuit are included at the same time by using the single crystal thin film so that high reliability can be obtained.

What is claimed is:

1. A light valve device comprising: a drive substrate having a drive electrode, a switching element connected to the drive electrode and a driving circuit for energizing the drive electrode through the switching element in response to a predetermined signal; an opposed substrate opposed to the drive substrate; and an electrooptical material layer arranged between the drive substrate and the opposed substrate; wherein the drive substrate has a structure including at least two layers which are composed of a transparent substrate layer and a semiconductor single crystal thin film layer comprising a thinned semiconductor single crystal wafer; the driving circuit is composed of an integrated circuit formed in the semiconductor single crystal thin film layer; and the drive electrode is integrated over the transparent substrate layer and connected to the switching element formed in the semiconductor single crystal thin film layer, so that when the drive electrode is energized by the driving circuit through the switching element, the energy of the drive electrode acts on the electrooptical material layer to control light transparency of the electrooptical material layer.

2. A light valve device according to claim 1; wherein the switching element comprises a plurality of pixel transistors arranged in a matrix shape; and the drive electrode comprises a plurality of pixel electrodes arranged in a matrix shape each connected to an individual pixel transistor and energized by the driving circuit.

3. A light valve device according to claim 2; wherein the integrated circuit includes a scanning circuit for scanning the pixel transistors connected to the pixel electrodes and arranged in a matrix shape.

4. A light valve device according to claim 3; wherein the integrated circuit includes an image signal processing circuit for processing an input image signal and for supplying a processed signal to the scanning circuit.

5. A light valve device according to claim 1; further comprising spacers disposed between the opposed substrate and the drive substrate for maintaining a predetermined gap between the opposed substrate and the drive substrate; and the electrooptical material layer being filled in the gap.

6. A light valve device according to claim 2; further comprising color filters divided into elements corresponding to the pixel electrodes in a matrix shape.

7. A light valve device according to claim 1; wherein the integrated circuit comprises an insulated gate transistor element having a channel region, and wherein the semiconductor single crystal thin film layer is electrically grounded between the channel region of the insulated gate transistor element and the transparent substrate layer.

8. A light valve device according to claim 1; wherein the switching element comprises an insulated gate field effect transistor having a source region, a drain region and a channel region, the channel region being formed in the semiconductor single crystal thin film layer.

9. A light valve device comprising: a substrate having a structure including at least two layers which are composed of at least a transparent substrate layer and a semiconductor single crystal thin film layer over the substrate layer, said semiconductor thin film layer comprising a thinned semiconductor single crystal wafer; a pixel electrode formed over the transparent substrate layer; a pixel switching element connected to the pixel electrode and formed in the semiconductor single crystal thin film layer; and a driving circuit integrally formed in the semiconductor single crystal thin film layer for energizing the pixel electrode through the pixel switching element.

10. A light valve device according to claim 9; wherein the semiconductor single crystal thin film layer is made of silicon.

11. A light valve device according to claim 10; wherein the single crystal silicon semiconductor thin film layer has a crystal azimuth in a uniform range of 0.0±1.0 degrees and a single crystal lattice defect density of at least 500/cm².

12. A light valve device according to claim 10; further comprising a thin film layer having a low resistance disposed between the single crystal silicon semiconductor thin film layer and the transparent substrate layer.

13. A light valve device according to claim 10; wherein the pixel electrode is formed of a transparent electrode and is formed on a transparent layer made by oxidizing a part of the single crystal silicon semiconductor thin film layer.

14. A light valve device according to claim 9, wherein the driving circuit includes an insulated gate field effect transistor comprising a drain region, a source region and a channel forming region between the drain region and the source region, the channel forming region being formed in the semiconductor single crystal thin film layer, and wherein the channel forming region is connected to a fixed electrical potential through the semiconductor single crystal thin film layer.

15. A light valve device according to claim 9; wherein the driving circuit is positioned apart from the pixel switching element, and wherein the semiconductor single crystal thin film layer has a smaller film thickness at a portion where the pixel switching element is formed than at a portion where the driving circuit is formed.

16. A light valve device according to claim 9; wherein the semiconductor single crystal thin film has a thickness of less than 5000 Å in the region where the pixel transistor is formed.

17. A light valve device according to claim 9; wherein the driving circuit comprises an insulated gate transistor element having a channel region, and wherein the semiconductor single crystal thin film layer is electrically grounded between the channel region of the insulated gate transistor element and the transparent substrate layer.

18. A light valve device according to claim 9; wherein the pixel switching element comprises an insulated gate field effect transistor having a source region, a drain region and a channel region, the channel region being formed in the semiconductor single crystal thin film layer.

19. A process for fabricating a light valve device comprising the steps of: bonding a semiconductor single crystal wafer to a substrate layer; thinning the bonded semiconductor single crystal wafer to a semiconductor single crystal thin film layer; forming a driving circuit in the semiconductor single crystal thin film layer; forming a pixel electrode over the substrate layer and a pixel switching element in the semiconductor single crystal thin film layer; and electrically connecting the driving circuit and the pixel electrode through the pixel switching element.

20. A process for fabricating a light valve device according to claim 19; wherein the step of bonding a semiconductor single crystal thin film layer to a substrate layer includes thermo-compressively bonding a plane surface of a semiconductor single crystal substrate which is made of silicon to a plane surface of a substrate layer which is made of quartz; and polishing and thinning the bonded silicon single crystal substrate.

21. A process for fabricating a light valve device according to claim 19; wherein the step of forming a driving circuit in the semiconductor single crystal thin film includes the steps of selectively oxidizing the semiconductor single crystal thin film layer to form a field oxide film region and a drive region surrounded by the field oxide film region; and forming a pixel switching element in the drive region.

22. A process for fabricating a light valve device according to claim 21; wherein the step of forming the pixel switching element comprises the step of forming an insulated gate field effect transistor having a source region, a drain region and a channel region, the channel region being formed in the semiconductor single crystal thin film layer.

23. A process for fabricating a light valve device according to claim 21; wherein the step of forming a pixel electrode over the substrate layer and a pixel switching element in the semiconductor single crystal thin film layer includes patterning and forming the pixel electrode on the field oxide film region.

24. A process for fabricating a light valve device according to claim 19; wherein the step of forming the driving circuit comprises forming an insulated gate transistor element having a channel region; and further including the step of electrically grounding the semiconductor single crystal thin film layer between the channel region of the insulated gate transistor element and the substrate layer.

25. A process for fabricating a light valve device comprising the steps of: preparing a drive substrate having at least two layers including a transparent substrate layer and a semiconductor single crystal thin film layer by bonding a semiconductor single crystal wafer to the transparent substrate layer and thinning the semiconductor single crystal wafer; forming a pixel electrode, a pixel switching element and a driving circuit which is connected with the pixel electrode through the pixel switching element on the semiconductor single crystal thin film layer; and arranging an opposed substrate opposing the drive substrate at a predetermined gap with the drive substrate; and disposing an electrooptical material layer in the gap.

26. A process for fabricating a light valve device according to claim 25; wherein the step of preparing a drive substrate includes thermo-compressively bonding a plane surface of a semiconductor single crystal substrate which is formed of silicon to a plane surface of the transparent substrate layer; and polishing and thinning the bonded silicon single crystal substrate.

27. A process for fabricating a light valve device according to claim 25; wherein the step of forming the driving circuit comprises forming an insulated gate transistor element having a channel region; and further including the step of electrically grounding the semiconductor single crystal thin film layer between the channel region of the insulated gate transistor element and the transparent substrate layer.

28. A process for fabricating a light valve device according to claim 25; wherein the step of forming the pixel switching element comprises forming an insulated gate field effect transistor having a source region, a drain region and a channel region, the channel region being formed in the semiconductor single crystal thin film layer.

29. A light valve device comprising: a drive substrate including a pixel section having a pixel electrode and a thin film switching element for selectively energizing the pixel electrode, a plurality of line electrodes electrically connected to the pixel section, and a driving circuit electrically connected to the plurality of line electrodes for providing a signal to the pixel section through the line electrodes; an opposed substrate opposing the drive substrate; and an electrooptical material layer disposed between the drive substrate and the opposed substrate; wherein the drive substrate comprises a transparent substrate layer and a semiconductor single crystal thin film layer formed on the transparent substrate layer; the driving circuit comprises an integrated circuit including a thin film transistor formed in the semiconductor single crystal thin film layer; the thin film switching element in the pixel section has an active region formed in the semiconductor single crystal thin film layer; and the crystal azimuth of the semiconductor single crystal thin film layer of the driving circuit has the same alignment as that of the semiconductor single crystal thin film layer of the pixel section.

30. A light valve device according to claim 29; wherein the crystal azimuth of the semiconductor single crystal thin film layer is in a uniform range of 0.0±1.0 degrees.

31. A light valve device according to claim 29; wherein the semiconductor single crystal thin film layer has a single crystal lattice defect density lower than 500/cm$^2$.

32. A light valve device according to claim 29; wherein the thin film transistor comprises a thin film insulated gate transistor element having a channel region, and wherein the semiconductor single crystal thin film layer is electrically grounded between the channel region of the thin film insulated gate transistor element and the transparent substrate layer.

33. A light valve device according to claim 29; wherein the thin film switching element comprises an insulated gate field effect transistor having a source region, a drain region and a channel region, the channel region being formed in the semiconductor single crystal thin film layer.

34. An image projection device having a light source for irradiating a light valve, and an optical lens for projecting an image displayed on the light valve, wherein the light valve comprises: a drive substrate including a pixel section having a pixel electrode and a thin film switching element for selectively energizing the pixel electrode, a plurality of line electrodes electrically connected to the pixel section, and a driving circuit electrically connected to the plurality of the line electrodes for providing a signal to the pixel section through the line electrodes; an opposed substrate opposing the drive substrate; and an electrooptical material layer between the drive substrate and the opposed substrate; wherein the drive substrate comprises a substrate layer and a semiconductor single crystal thin film layer bonded on the substrate layer, the thin film switching element and the driving circuit being formed in the semiconductor single crystal thin film layer.

35. An image projection device according to claim 34; wherein the crystal azimuth of the semiconductor single crystal thin film layer has the same alignment in the region in which the driving circuit is formed as that of the region in which the thin film switching element is formed.

36. An image projection device according to claim 34; wherein the substrate layer is formed of quartz.

37. An image projection device according to claim 34; wherein the thin film switching element comprises a thin film insulated gate transistor element having a channel region, and wherein the semiconductor single crystal thin film layer is electrically grounded between the channel region of the thin film insulated gate transistor element and the substrate layer.

38. An image projection device according to claim 34; wherein the thin film switching element comprises an insulated gate field effect transistor having a source region, a drain region and a channel region, the channel region being formed in the semiconductor single crystal thin film layer.

39. A light valve device comprising: a substrate having a structure including at least two layers which are composed of at least a substrate layer and a semiconductor single crystal thin film layer disposed over the substrate layer, the semiconductor thin film layer comprising a thinned semiconductor single crystal wafer; a pixel electrode formed over the substrate layer; a pixel switching element connected to the pixel electrode and formed in the semiconductor single crystal thin film layer; and a driving circuit formed in the semiconductor single crystal thin film layer for energizing the pixel electrode through the pixel switching element; wherein the driving circuit is positioned apart from the pixel switching element; and wherein the semiconductor single crystal thin film layer has a smaller film thickness at a portion where the pixel switching element is formed than at a portion where the driving circuit is formed.

40. A light valve device comprising: a substrate having a structure including at least two layers which include at least a substrate layer and a semiconductor single crystal thin film layer disposed over the substrate layer, the semiconductor thin film layer being a thinned semiconductor single crystal wafer; a pixel electrode formed over the substrate layer; a pixel switching element connected to the pixel electrode and having an active region formed in the semiconductor single crystal thin film layer; and a driving circuit formed in the semiconductor single crystal thin film layer for energizing the pixel electrode through the pixel switching element, wherein the semiconductor single crystal thin film layer has a thickness of less than 5000 Å in a region where the active region of the pixel switching element is formed.

41. A light valve device according to claim 40; wherein the driving circuit comprises an insulated gate transistor element having a channel region, and wherein the semiconductor single crystal thin film layer is electrically grounded between the channel region of the insulated gate transistor element and the substrate layer.

42. A light valve device according to claim 40; wherein the pixel switching element comprises an insulated gate field effect transistor having a source region, a drain region and a channel region, the channel region being formed in the semiconductor single crystal thin film layer.

43. An image projection device having a light source for irradiating a light valve, and an optical lens for projecting an image displayed on the light valve, wherein the light valve comprises: a drive substrate including a pixel having a pixel electrode and a thin film switching element for selectively energizing the pixel electrode, a plurality of line electrodes electrically connected to the pixel section, and a driving circuit electrically connected to the plurality of the line electrodes for providing a signal to the pixel section through the line electrodes; an opposed substrate opposing the drive substrate; and an electrooptical material layer disposed between the drive substrate and the opposed substrate; wherein the drive substrate comprises a substrate layer and a semiconductor single crystal thin film layer formed on the substrate layer, and the semiconductor single crystal thin film layer has a thickness of less than 5000 Å in a region where the active region of the thin film switching element is formed.

44. An image projection device according to claim 43; wherein the thin film switching element comprises a thin film insulated gate transistor element having a channel region, and wherein the semiconductor single crystal thin film layer is electrically grounded between the channel region of the thin film insulated gate transistor element and the substrate layer.

45. An image projection device according to claim 43; wherein the thin film switching element comprises an insulated gate field effect transistor having a source region, a drain region and a channel region, the channel region being formed in the semiconductor single crystal thin film layer.

46. A light valve device comprising: a substrate having at least a transparent layer and a semiconductor single crystal layer disposed over the transparent layer; a pixel electrode formed over the transparent layer; a pixel switching element connected to the pixel electrode; and an insulating gate transistor element having a channel region for energizing the pixel electrode through the pixel switching element, the channel region of the insulating gate transistor element being electrically connected to a fixed electrical potential.

47. A light valve device according to claim 46; wherein the pixel switching element is formed in the semiconductor single crystal layer.

48. A light valve device according to claim 46; wherein the insulating gate transistor element is integrally formed in the semiconductor single crystal layer.

49. A light valve device according to claim 46; wherein the pixel switching element comprises an insulated gate field effect transistor having a source region, a drain region and a channel region, the channel region being formed in the semiconductor single crystal layer.

* * * * *